Sept. 7, 1926.
E. E. GREVE
1,599,087
SAFETY HOOK
Filed June 4, 1925
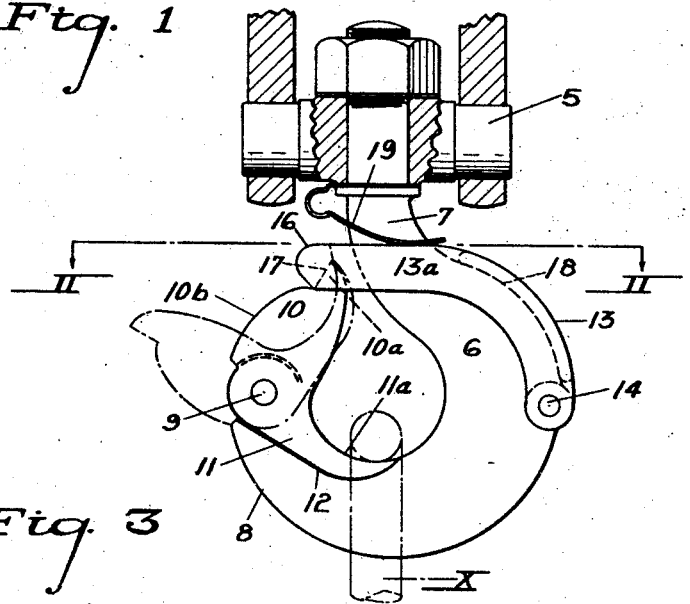
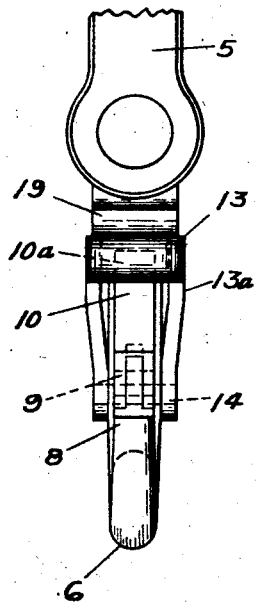
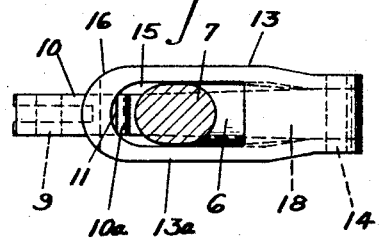

Patented Sept. 7, 1926.

1,599,087

UNITED STATES PATENT OFFICE.

EDGAR E. GREVE, OF BELLEVUE, PENNSYLVANIA.

SAFETY HOOK.

Application filed June 4, 1925. Serial No. 34,848.

This invention is for an improvement in hooks of the type commonly employed in oil drilling, hoisting, and other operations.

When using hooks in a drilling derrick or other hoisting operation, it is desirable that the hook be of such a construction that there will be no projecting parts which can become caught in the derrick or other structure. At the same time it is desirable that the hook be of such a character that any object being carried thereby cannot become dislodged from the hook except at the will of the operator.

The present invention has for its main objects to provide a safety hook embodying the construction above specified; a hook which is cheap to manufacture and one that is simple and positive in its operation.

The invention may be readily understood by reference to the accompanying drawings, in which:

Fig. 1 is side elevation of a hook embodying my invention;

Fig. 2 a plan view of the safety catch or latch; and,

Fig. 3 a front view of the hook.

In the drawings, 5 indicates a suitable supporting element in which the hook is carried, this being of any well known or preferred construction. The hook is designated generally as 6, 7 being the shank portion thereof and 8 the nose or bill. Carried on a transverse pin 9 in the nose or the bill, is a two armed guard member, the upper arm 10 being the heavier and having a projection 10$^a$ at its extremities, the outer surface 10$^b$ preferably being convexed to conform to the general curvature of the hook. The second arm 11 is at substantially right angles to the first and has a concaved face 11$^a$. This arm is normally received in a suitably shaped recess 12 in the bottom of the hook so that its concaved surface 11$^a$ is flush with and conforms to the inner surface of the hook.

When the arm 11 is seated in the recess, the arm 10 is in a generally upright position, but inclined toward the shank of the hook. To positively lock the guard member in position, a latch 13 is provided. This latch is preferably of the form shown in Fig. 2, and is designed to be pivoted to the shank at 14. Member 13 has an upwardly extending curved position 13$^a$ that is slotted at 15 to straddle the shank of the hook, while the end 16 thereof, has a ratchet-tooth notch 17 therein. A part 18 of the latch rests on the shank of the hook to prevent the latch from dropping below a substantially horizontal position.

Ordinarily, the projection 10$^a$ on the end of arm 10 is received in the notch 17 to prevent the guard from opening. If desired, a leaf spring 19 may be provided at the upper end of the shank to bear against the latch and resiliently hold it from lifting.

In addition to the latch for holding the guard in closed position, the bail X of an object carried by the hook will normally rest on the lower arm 11, and hold the guard against accidental displacement.

To open the hook, the latch 13 is lifted, releasing the end of arm 10. Arm 10 may be swung out as shown in dotted lines, and being heavier than arm 11, will hold the guard open. At such time, the other arm 11 will be raised to close the mouth of the hook. Therefore, nothing can be inserted in the hook without pushing the arm 11 down to close the guard.

The hook as thus formed, is symmetrical and has no projections capable of being hooked into a derrick frame or other structure. At the same time, the safety feature is simple, positive and safe.

Various changes in the detail construction and arrangement of parts are, of course, contemplated within the scope of my invention.

I claim as my invention:

1. A safety hook comprising a hook structure having a shank and a bill, and a guard member pivotally carried on the bill, said guard member having two arms angularly disposed with respect to each other, one arm normally lying in the bottom of the hook and the other normally closing the gap between the bill and the shank, the bottom of the hook being recessed to receive said first arm, said second mentioned arm being heavier than the first, and a spring pressed latch member pivotally mounted on the shank and releasably engaging the second arm.

2. A safety hook comprising a hook member having a bill and a shank, a guard member pivotally mounted on the bill and having two angularly disposed arms thereon, one arm normally being directed down against the hook and the other normally extending up across the gap between the bill and the shank, and a latch member pivotally mounted on the shank of the hook and releasably engaging said second mentioned arm, said latch member having a portion straddling the shank and an end portion engaging the said second arm.

In testimony whereof I affix my signature.

EDGAR E. GREVE.